US009296078B2

(12) United States Patent
Zeng et al.

(10) Patent No.: US 9,296,078 B2
(45) Date of Patent: Mar. 29, 2016

(54) CUTTER MAGAZINE, CUTTER SWITCHING SYSTEM USING THE CUTTER MAGAZINE, AND MACHINE TOOL USING THE CUTTER SWITCHING SYSTEM

(75) Inventors: Xian-Cai Zeng, Shenzhen (CN); Dong-Cheng Liu, Shenzhen (CN); Chin-Tsan Huang, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 965 days.

(21) Appl. No.: 13/428,367

(22) Filed: Mar. 23, 2012

(65) Prior Publication Data

US 2013/0085049 A1 Apr. 4, 2013

(30) Foreign Application Priority Data

Sep. 30, 2011 (CN) ......................... 201110291657.4

(51) Int. Cl.
*B23Q 3/155* (2006.01)
*B23Q 3/157* (2006.01)

(52) U.S. Cl.
CPC ........ *B23Q 3/15526* (2013.01); *B23Q 3/15506* (2013.01); *B23Q 3/15706* (2013.01); *Y10T 483/13* (2015.01); *Y10T 483/1795* (2015.01);
(Continued)

(58) Field of Classification Search
CPC ............ Y10T 483/13; Y10T 483/1767; Y10T 483/1779; Y10T 483/179; Y10T 483/1793; Y10T 483/1795; Y10T 483/1798; Y10T 483/1873; Y10T 483/1882; Y10T 483/1809; B23Q 3/15526
USPC ........ 483/7, 44, 49, 54, 55, 56, 57, 59, 66, 67
See application file for complete search history.

(56) References Cited

U.S. PATENT DOCUMENTS 3,657,627 A * 4/1972 Inaba et al. .................. 318/601
3,691,626 A * 9/1972 Mousseau et al. ............. 483/44
(Continued)

FOREIGN PATENT DOCUMENTS

CN 1132675 A 10/1996
CN 101010164 A 8/2007
(Continued)

OTHER PUBLICATIONS

EPO Machine Translation of EP-2177310-A2—Kaemmerer et al., “Machining centre with tool changer,” Apr. 21, 2010.*

*Primary Examiner* — Sunil K Singh
*Assistant Examiner* — Michael Vitale
(74) *Attorney, Agent, or Firm* — Novak Druce Connolly Bove + Quigg LLP

(57) ABSTRACT

A cutter switching system includes a supporting platform, a cutter magazine mounted on the supporting platform, and a sensing assembly mounted on the cutter magazine. The cutter magazine includes a cutter storing frame and a driving assembly. The cutter storing frame includes a cylindrical main body, and a plurality of cutters mounted all around the main body. The driving assembly includes a cam indexer engaging with the cutter storing frame for rotating the cutter storing frame. The sensing assembly is mounted on the cam indexer, and the sensor senses the rotation of the cam indexer to establish the static position and the rotation required of the cutter magazine. The present disclosure further provides a machine tool using the cutter switching system.

12 Claims, 2 Drawing Sheets

100
1532
153
1546
1535
1536
1537
1531
1538
30
10
1534
1533
311
31
1517
1529
1518
1523
1515
151
1513
131
13
11

(52) U.S. Cl.
CPC ...... *Y10T 483/1809* (2015.01); *Y10T 483/1873* (2015.01)

(56) References Cited

U.S. PATENT DOCUMENTS

| | | | | | |
|---|---|---|---|---|---|
| 3,762,568 | A | * | 10/1973 | Dimitrov | B23Q 1/4828 211/1.51 |
| 4,109,188 | A | * | 8/1978 | Shima et al. | 318/602 |
| 4,344,221 | A | * | 8/1982 | Pagani | 483/8 |
| 4,920,631 | A | * | 5/1990 | Novak | 483/61 |
| 5,885,199 | A | * | 3/1999 | Shao | 483/19 |
| 2007/0258797 | A1 | * | 11/2007 | Gordon et al. | 414/276 |
| 2012/0172185 | A1 | * | 7/2012 | Yang | B23Q 3/15526 483/13 |

FOREIGN PATENT DOCUMENTS

| | | | | |
|---|---|---|---|---|
| CN | 201205655 | Y | | 3/2009 |
| CN | 101480780 | A | | 7/2009 |
| DE | 3707318 | A1 | * | 9/1988 |
| EP | 2177310 | A2 | | 4/2010 |
| JP | 03239443 | A | * | 10/1991 |
| SU | 1551515 | A | * | 3/1990 |

* cited by examiner

CUTTER MAGAZINE, CUTTER SWITCHING SYSTEM USING THE CUTTER MAGAZINE, AND MACHINE TOOL USING THE CUTTER SWITCHING SYSTEM

BACKGROUND

1. Technical Field

The present disclosure relates to cutter magazines, particularly to a cutter magazine of cutters for machining work, a cutter switching system using the cutter magazine, and a machine tool using the cutter switching system.

2. Description of Related Art

Machine tools, such as a CNC machine tool, includes a cutter magazine carrying a plurality of cutters for manufacturing a plurality of workpieces. However, the greater the number of cutters carried at the cutter magazine, the greater is the amount of space needed for the cutter magazine. Thus the machine tool needs a larger amount of working space. A disk-shaped cutter magazine can be designed for carrying cutters at the circumference of the machine tool. In order to store more cutters, the diameter of the cutter magazine is expanded to achieve a larger storage area, and resulting in the machine tool occupying an even larger amount of working space.

Therefore, there is room for improvement in the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
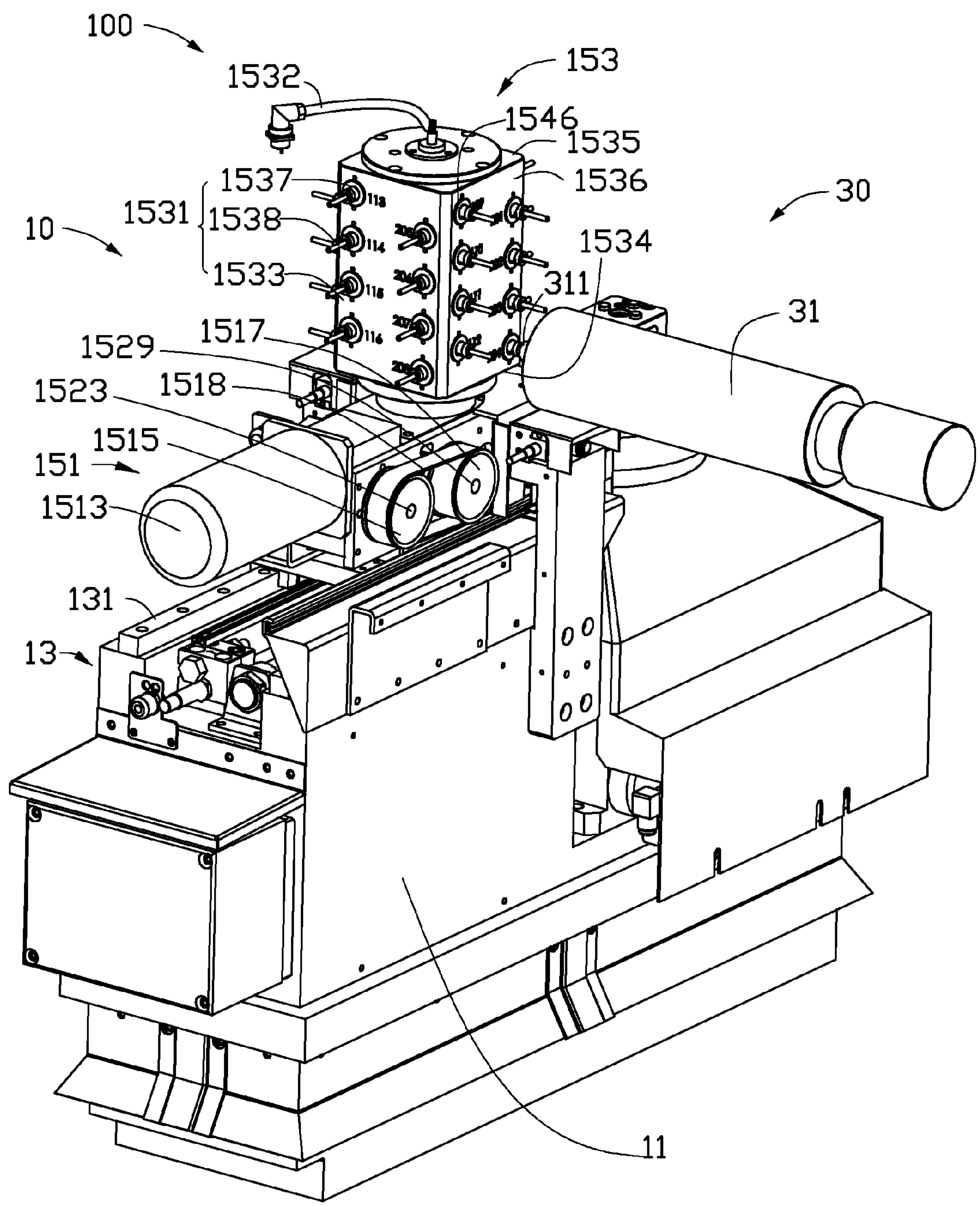
FIG. 1 is an isometric view of an embodiment of a machine tool complete with a cutter magazine.
Figure 2:
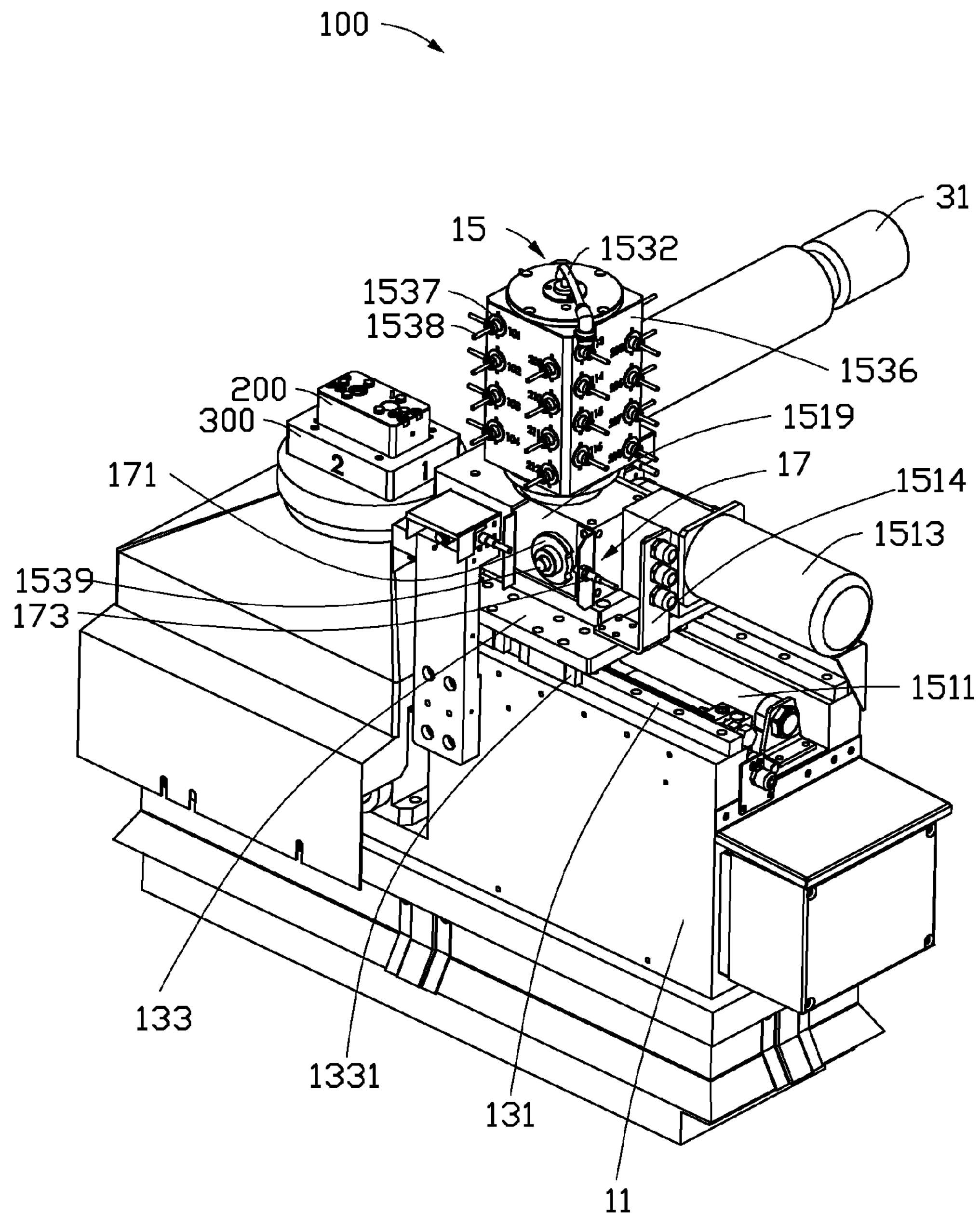
FIG. 2 is similar to FIG. 1, but viewed from another aspect.

Referring to FIGS. 1 and 2, an embodiment of a machine tool 100 is used to manufacture a workpiece 200. The machine tool 100 includes a cutter switching system 10 and a machining system 30 mounted on a side of the cutter switching system 10. Both of the cutter switching system 10 and the machining system 30 carry a plurality of cutters 1538. In the illustrated embodiment, the machine tool 100 is a milling machine, and the cutters 1538 are a plurality of milling cutters. The machining system 30 may choose the cutters 1538 from the cutter switching system 10 to mill the workpiece 200 in a predetermined manner.

The cutter switching system 10 includes a supporting platform 11, a guiding member 13, a cutter magazine 15, and a sensing assembly 17. The supporting platform 11 is substantially a cuboid-shaped body, for supporting the guiding member 13, the cutter magazine 15, and the sensing assembly 17. The guiding assembly 13 is mounted on the supporting platform 11, and the cutter magazine 15 is slidably mounted on the guiding assembly 13. The sensing assembly 17 is mounted on the cutter magazine 15, for sensing the static (and thus starting) position of the cutter magazine 15, and the number of degrees of rotation of the cutter magazine 15.

The guiding assembly 13 includes a guiding member 131 mounted on the supporting platform 11, and a bearing plate 133 mounted on the guiding member 131. In the illustrated embodiment, the guiding member 131 is a pair of guiding rails. The bearing plate 133 forms a pair of sliding rails 1331 at a side facing towards the guiding member 131. The sliding rails 1331 slide along the guiding member 131, to make the bearing plate 133 slide relative to the supporting platform 11. The cutter magazine 15 is mounted on the bearing plate 133. The guiding assembly 13 may be some other element configured for allowing movement, such as a roller, a wheel, or the like.

The cutter magazine 15 includes a driving assembly 151 mounted on the bearing plate 133, and a cutter storage assembly 153 mounted on the driving assembly 151. The driving assembly 151 drives the cutter storage assembly 153 to rotate. The driving assembly 151 includes a first driving member 1511, a second driving member 1513, a mounting plate 1514, a first transmission member 1515, a second transmission member 1517, a transmission belt 1518, and a cam indexer 1519.

The first driving member 1511 is mounted on the supporting platform 11, and positioned between the guiding rails of the guiding member 131. The first driving member 1511 includes a driving end (not shown) fixed with the bearing plate 133, to drive the bearing plate 133 to slide along the guiding member 131. The second driving member 1513 is fixed on the bearing plate 133 via the mounting plate 1514, and parallel to the first driving member 1511. The cam indexer 1519 is mounted on the bearing plate 133 next to the second driving member 1513. The cutter storage assembly 153 is mounted on the cam indexer 1519. The second driving member 1513 forms a driving rod 1523 protruding out from a sidewall thereof. The cam indexer 1519 forms a first transmission rod 1529 and a second transmission rod 1539 protruding outwards at opposite sidewalls thereof, and the first transmission rod 1529 is at the same side as the driving rod 1523.

The first transmission rod 1529, the second transmission rod 1539, and the driving rod 1523 are all horizontal and parallel to each other. The first transmission member 1515 is sleeved on the driving rod 1523, and the second driving member 1513 drives the first transmission member 1515 to rotate via the driving rod 1523. The second transmission member 1517 is sleeved on the first transmission rod 1529, and the transmission belt 1518 couples the first transmission member 1515 with the second transmission member 1517, thus the first transmission member 1515 causes the second transmission member 1517 to rotate via the transmission belt 1518, and the second transmission member 1517 causes or enables the cam indexer 1519 to rotate via the first transmission rod 1529.

In the illustrated embodiment, the first driving member 1511 is a cylinder. The second driving member 1513 is a motor. The first transmission member 1515 and the second transmission member 1517 are a plurality of transmission gears. The first transmission member 1515 and the second transmission member 1517 rotate round the driving rod 1523 and the first transmission rod 1529, respectively. The cam indexer 1519 rotates round the radial shaft of the cutter storage assembly 153.

The cutter storage assembly 153 includes a cutter storing frame 1531, a pneumatic member (not shown), and an air pipe 1532. The cutter storing frame 1531 is mounted on the cam indexer 1519 via a driving shaft (not shown). The cutter storing frame 1531 includes a main body 1533, a plurality of mounting jackets 1537 mounted on the main body 1533, and a plurality of cutters 1538 mounted on the mounting jacket 1537. The main body 1533 is substantially a hollow box, forming a first mounting surface 1534 facing the cam indexer 1519, a second mounting surface 1535 parallel to the first mounting surface 1534, and four cutter storing sidewalls 1536 perpendicular to the first mounting surface 1534 and the second mounting surface 1535. The pneumatic member is received in the cutter storing frame 1531. The air pipe 1532 is mounted on the second mounting surface 1535, and communicates with the pneumatic member, to transport air flow forcefully to the pneumatic member. Each of the cutter storing sidewalls 1536 defines a plurality of mounting holes 1546 configured along a line of which zigzags across and down the cutter storing sidewall 1536. The mounting jackets 1537 are mounted on the mounting holes 1546. The pneumatic member controls the mounting jackets 1537 to clamp the cutters 1538 driven by the force of the air in the air pipe 1532 or to release the cutters 1538.

The sensing assembly 17 includes a sensing cam 171, a sensor 173, and a controller (not shown) mounted on the bearing plate 133. The sensing cam 171 is mounted on the second transmission rod 1539, and can be driven to rotate by the cam indexer 1519 via the second transmission rod 1539. The sensor 173 is mounted on the cam indexer 1519 besides the sensing cam 171, for sensing the rotation of the sensing cam 171, and then reporting the degrees of rotation to the controller. In the illustrated embodiment, the sensing cam 171 rotates round the second transmission rod 1539. When the cam indexer 1519 drives the cutter storing frame 1531 to rotate 90 degrees, the sensing cam 171 is driven to rotate a complete circle.

The machining system 30 includes a machining mechanism (not shown) positioned besides the supporting platform 11, and a machining spindle 31 mounted on the machining mechanism. The controller controls the machining mechanism to drive the machining spindle 31. The machining spindle 31 is substantially columnar, and positioned perpendicular to one cutter storing sidewall 1536. The machining spindle 31 forms a machining end 311 at the end thereof towards the cutter magazine 15, for clamping the cutter 1538 to machine a workpiece 200. In the illustrated embodiment, the machining spindle 31 is perpendicular to the guiding member 131.

In assembly, first, the guiding member 131 is mounted on the supporting platform 11, and the bearing plate 133 is mounted on the guiding member 131. The first driving member 1511 is mounted on the supporting platform 11, and the driving end of the first driving member 1511 is fixed with the bearing plate 133. Second, the cam indexer 1519 and the second driving member 1513 are mounted on the bearing plate 133. The first transmission member 1515, the second transmission member 1517, and the sensing cam 171 are respectively sleeved on the driving rod 1523, the first transmission rod 1529, and the second transmission rod 1539. The transmission belt 1518 couples the first transmission member 1515 with the second transmission member 1517. Third, the sensor 173 is mounted on the cam indexer 1519 beside the sensing cam 171, and the controller is mounted on the bearing plate 133. Finally, the storing frame 1531 is mounted on the cam indexer 1519, and the pneumatic member is received in the main body 1533, and connected with the air pipe 1532. The machining mechanism is positioned besides the supporting platform 11, and the machining spindle 31 is mounted on the machining mechanism towards the cutter magazine 15.

In use, a workpiece 200 is mounted on a mounting platform 300 beside the supporting platform 11. The machining mechanism drives the machining spindle 31 to machine the workpiece 200. During the machining process, different cutters 1538 are needed for machining. The machining spindle 31 is driven to move close to one cutter storing sidewall 1536, and the controller controls the machining spindle 31 to place a previously-used cutter 1538 into a free mounting jacket 1537, and then the pneumatic member drives the mounting jacket 1537 to clamp the previously-used cutter 1538. Then the controller controls the second driving member 1513 to drive the first transmission member 1515 to rotate, and further to drive the cam indexer 1519 to rotate via the second transmission member 1517.

The sensor 173 senses the degrees of rotation of the cutter storing frame 1531 by sensing the number of rotations of the sensing cam 171. When the cutter storing frame 1531 rotates to make the cutter storing sidewall 1536 that is carrying the needed or required cutter 1538 to face the machining spindle 31, the sensor 173 transmit the message to the controller, and then the controller controls the second driving member 1513 to stop driving the first transmission member 1515. In addition, the controller controls the first driving member 1511 to drive the bearing plate 133 to move and controls the machining spindle 31 to move, until the machining spindle 31 is aligned with the needed cutter 1538. Then the machining end 311 clamps the needed cutter 1538, and the pneumatic member releases the needed cutter 1538. The machining spindle 31 moves to machine the workpiece 200 while clamping the needed cutter 1538.

It is noted that, the cam indexer 1519 can be driven by other driving members, such as a motor directly. The sensor 173 can be replaced by a sensor sensing the rotation of the cam indexer 1519, and the sensing cam 171 can be omitted. A pair of machining spindles 31 can be mounted on the machining mechanism, and one machining spindle 31 will actually machine the workpiece, while the other machining spindle 31 will exchange cutters 158 synchronously. The cutter storing frame 1531 can be another shape, such as hexagonal, and the sensing cam 171 can be rotated one complete circle by having the cam indexer 1519 rotating 60 degrees.

Because of the cutter storing frame 1531 being substantially cylindrical and columnar, the machine tool 100 saves on the amount of radial space used. The amount of storage area available to carry the cutters 1538 is greatly increased. A pair of machining spindles 31 can be used synchronously, thus a higher machining efficiency is achieved. Each sidewall of the cutter storing frame 1531 can be used to store the plurality of cutters 1538, thus a large number of cutters 1538 can be stored. The sensor 173 senses whether the cutter storing frame 1531 has been rotated to a required or needed angular degrees or not, and the controller controls the machining mechanism to drive the machining spindle 31 to move, and controls the first driving member 1511 to drive the bearing plate 133 to move, until the machining end 311 aligns with the needed cutter 1538, so that the machining end 311 will always clamp the needed cutter 1538 precisely.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A cutter magazine, used for storing a plurality of cutters, comprising:

a cutter storing frame comprising a main body;

a driving assembly comprising a cam indexer for driving the cutter storing frame to rotate;

wherein the main body is substantially a hollow box; the main body comprises a first mounting surface facing the cam indexer, a second mounting surface parallel to the first mounting surface, and four cutter storing sidewalls perpendicular to the first mounting surface and the second mounting surface, the plurality of cutters are mounted on the main body at each of the cutter storing sidewalls;

wherein each of the cutter storing sidewalls defines a plurality of mounting holes, the cutter storing frame further comprises a plurality of mounting jackets mounted in the corresponding mounting holes, respectively; the plurality of cutters are mounted in the corresponding mounting jackets, respectively; an air pipe for controlling the mounting jackets to clamp and release the corresponding cutters, and the air pipe is mounted on the second mounting surface.

2. A cutter switching system, used for machining a workpiece, comprising:

a support platform;

a cutter magazine mounted on the support platform, comprising a cutter storing frame and a driving assembly; and a sensing assembly mounted on the cutter magazine;

wherein the cutter storing frame comprises a main body; the main body is substantially a hollow box; the driving assembly comprises a cam indexer for driving the cutter storing frame to rotate; the main body comprises a first mounting surface facing the cam indexer, a second mounting surface parallel to the first mounting surface, and four cutter storing sidewalls perpendicular to the first mounting surface and the second mounting surface, the plurality of cutters are mounted on the main body at each of the cutter storing sidewalls; the cutter storing frame is mounted on the cam indexer; the sensing assembly comprises a sensor mounted on the cam indexer, and the sensor senses a rotation of the cam indexer;

wherein each of the cutter storing sidewalls defines a plurality of mounting holes, the cutter storing frame further comprises a plurality of mounting jackets mounted in the corresponding mounting holes, respectively; the plurality of cutters are mounted in the corresponding mounting jackets, respectively; an air pipe for controlling the mounting jackets to clamp and release the corresponding cutters, and the air pipe is mounted on the second mounting surface.

3. The cutter switching system of claim 2, wherein the cutter switching system further comprises a guiding assembly; the guiding assembly comprises a guiding member mounted on the support platform, and a bearing plate movably mounted on the guiding member; the cutter magazine is mounted on the bearing plate; the driving assembly further comprises a first driving member to drive the bearing plate to move relative to the guiding member.

4. The cutter switching system of claim 3, wherein the guiding member comprises a pair of guiding rails; the bearing plate forms a pair of sliding rails; the sliding rails slidably engage with the guiding member to make the bearing plate slide along the guiding member.

5. The cutter switching system of claim 2, wherein the sensing assembly further comprises a sensing cam mounted on the cam indexer; the cam indexer drives the sensing cam to rotate; the sensor is mounted on the cam indexer adjacent to the sensing cam.

6. The cutter switching system of claim 5, wherein the driving assembly further comprises a second driving member, a first transmission member engaged with the second driving member, a second transmission member engaged with the cam indexer, and a transmission belt connects the first transmission member with the second transmission member; the second driving member drives the cam indexer to rotate via the first transmission member, the second transmission member, and the transmission belt.

7. A machine tool, used for machining a workpiece, comprising:

a machining system comprising a machining spindle clamping a cutter to machine the workpiece;

a cutter switching system, for providing a plurality of cutters for the machining system, comprising a supporting platform, a cutter magazine mounted on the supporting platform, and a sensing assembly mounted on the cutter magazine, the cutter magazine comprising a cutter storing frame and a driving assembly;

wherein the cutter storing frame comprises a main body, and the plurality of cutters mounted on the main body; the main body is substantially a hollow box; the driving assembly comprises a cam indexer for driving the cutter storing frame to rotate; the main body comprises a first mounting surface facing the cam indexer, a second mounting surface parallel to the first mounting surface, and four cutter storing sidewalls perpendicular to the first mounting surface and the second mounting surface, the plurality of cutters are mounted on the main body at each of the cutter storing sidewalls; the cutter storing frame is mounted on the cam indexer; the sensing assembly comprises a sensor mounted on the cam indexer, and the sensor senses a rotation of the cam indexer;

wherein each of the cutter storing sidewalls defines a plurality of mounting holes, the cutter storing frame further comprises a plurality of mounting jackets mounted in the corresponding mounting holes, respectively; the plurality of cutters are mounted in the corresponding mounting jackets, respectively; an air pipe for controlling the mounting jackets to clamp and release the corresponding cutters, and the air pipe is mounted on the second mounting surface.

8. The machine tool of claim 7, wherein the cutter switching system further comprises a guiding assembly; the guiding assembly comprises a guiding member mounted on the support platform, and a bearing plate movably mounted on the guiding member; the cutter magazine is mounted on the bearing plate; the driving assembly further comprises a first driving member to drive the bearing plate to move relative to the guiding member.

9. The machine tool of claim 8, wherein the guiding member comprises a pair of guiding rails; the bearing plate forms a pair of sliding rails; the sliding rails slidably engage with the guiding member to make the bearing plate slide along the guiding member.

10. The machine tool of claim 7, wherein the sensing assembly further comprises a sensing cam mounted on the cam indexer; the cam indexer drives the sensing cam to rotate; the sensor is mounted on the cam indexer adjacent to the sensing cam.

11. The machine tool of claim 10, wherein the driving assembly further comprises a second driving member, a first transmission member engaged with the second driving member, a second transmission member engaged with the cam indexer, and a transmission belt connects the first transmission member with the second transmission member; the second driving member drives the cam indexer to rotate via the first transmission member, the second transmission member, and the transmission belt.

12. The machine tool of claim 7, wherein the machining system further comprises a machining mechanism, the machining spindle is mounted on the machining mechanism.

* * * * *